(12) United States Patent
Winkelmeyr et al.

(10) Patent No.: US 11,125,338 B2
(45) Date of Patent: Sep. 21, 2021

(54) RING FOR A FLOATING RING SEAL

(71) Applicant: AUDI AG, Ingolstadt (DE)

(72) Inventors: Felix Winkelmeyr, Ingolstadt (DE);
Bernhard Karl, Gaimersheim (DE);
Peter Winkelmeyr, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 174 days.

(21) Appl. No.: 15/976,105

(22) Filed: May 10, 2018

(65) Prior Publication Data

US 2018/0347705 A1    Dec. 6, 2018

(30) Foreign Application Priority Data

Jun. 6, 2017 (DE) .................... 10 2017 209 482.6

(51) Int. Cl.
*F16J 15/44* (2006.01)
*F16J 15/3244* (2016.01)
*F16J 15/34* (2006.01)

(52) U.S. Cl.
CPC ......... *F16J 15/441* (2013.01); *F16J 15/3244* (2013.01); *F16J 15/3404* (2013.01); *F16J 15/3412* (2013.01)

(58) Field of Classification Search
CPC .... F16J 15/441; F16J 15/3244; F16J 15/3404; F16J 15/3412; F16J 15/16
See application file for complete search history.

(56) References Cited

U.S. PATENT DOCUMENTS

| 1,683,756 | A | * | 9/1928 | Blache | F16J 15/3408 277/360 |
|---|---|---|---|---|---|
| 3,744,805 | A | * | 7/1973 | Heinrich | F16J 15/3412 277/400 |
| 5,806,987 | A | | 9/1998 | Nose et al. | |
| 7,044,470 | B2 | * | 5/2006 | Zheng | F16J 15/342 277/400 |
| 2002/0122610 | A1 | | 9/2002 | Shiraishi | |
| 2004/0080112 | A1 | * | 4/2004 | Tejima | F16J 15/3404 277/306 |
| 2014/0159314 | A1 | | 6/2014 | Hosoe et al. | |
| 2014/0167362 | A1 | | 6/2014 | Hosoe et al. | |
| 2014/0203517 | A1 | | 7/2014 | Ferris et al. | |
| 2018/0128377 | A1 | | 5/2018 | Tokunaga et al. | |

FOREIGN PATENT DOCUMENTS

| CN | 1386173 A | 12/2002 |
|---|---|---|
| CN | 103649608 A | 3/2014 |
| CN | 103732957 A | 4/2014 |
| DE | 41 19 324 A1 | 12/1992 |

(Continued)

OTHER PUBLICATIONS

European Search Report dated Oct. 5, 2018, in connection with corresponding EP Application No. 18168675.9 (13 pgs., including partial machine-generated English translation).

(Continued)

*Primary Examiner* — Eugene G Byrd
(74) *Attorney, Agent, or Firm* — Maier & Maier, PLLC

(57) ABSTRACT

A ring for a floating ring seal having an active face. The active face has an inner zone with a surface and an outer zone with a surface. The outer zone surrounds the inner zone coaxially. Each of the two surfaces has a structure produced with a laser.

9 Claims, 1 Drawing Sheet

(56) References Cited

FOREIGN PATENT DOCUMENTS

| | | | | |
|---|---|---|---|---|
| DE | 102 14 637 A1 | 10/2003 | | |
| DE | 11 2015 003 163 T5 | 4/2017 | | |
| EP | 1 517 057 A2 | 3/2005 | | |
| EP | 1517057 A3 | 5/2007 | | |
| EP | 2752602 A1 | 7/2014 | | |
| EP | 2752603 A1 | 7/2014 | | |
| JP | 57161367 A | * 10/1982 | ........... | F16J 15/3412 |
| JP | 57163770 A | * 10/1982 | ........... | F16J 15/3412 |
| JP | 59231269 A | * 12/1984 | ........... | F16J 15/3412 |
| JP | 04272582 A | * 9/1992 | ........... | F16J 15/3412 |
| JP | 2014055645 A | * 3/2014 | ............. | F16J 15/441 |
| WO | 02/04844 A2 | 1/2002 | | |
| WO | 2013/068419 A1 | 5/2013 | | |
| WO | 2016/186019 A1 | 11/2016 | | |

OTHER PUBLICATIONS

Office Action dated Oct. 12, 2019, in corresponding Chinese Application No. 201810567502.0; 13 pages.

Examination Report dated Feb. 2, 2018 of corresponding German application No. 10 2017 209 482.6; 7 pgs.

Office Action dated Sep. 2, 2020 in corresponding Chinese Application No. 201810567502.0; 12 pages including English-language translation.

* cited by examiner

RING FOR A FLOATING RING SEAL

FIELD

The invention relates to a ring for a floating ring seal and a floating ring seal.

BACKGROUND

For example, a floating ring seal is designed as part of a drive unit, wherein a cooling agent is used as a liquid. One surface of the floating ring seal is structurized in order to prevent a leakage of a liquid upon rotating in a first direction, resulting in a forward movement of a device driven by the drive unit, for which reason a structure incorporated into the surface acts as a barrier for the liquid. However, a drying out of the floating ring seal cannot be avoided with such a structure, so that an increased leakage is to be expected when rotating in a second direction, resulting in a backward movement of the device, based on the pumping effect of the structure. Without such a structure, a maximum leakage in both directions of movement as demanded by the specifications is not guaranteed. Running dry of cooling agent may lead to failure of the floating ring seal and thus also to failure of the drive unit, which is designed, e.g., as an electric motor.

A dynamic pressure thrust bearing part and a method for the fabrication thereof are known from the document EP 1 517 057 A2. This bearing part comprises in this case an outer and an inner region, both of which have structurizations.

From document U.S. Pat. No. 5,806,987 A there is known a hydrodynamic seal bearing with a structurizing section.

A dynamic pressure-based thrust bearing is described in document US 2002/122610 A1. In this case, grooves are formed on one surface of the thrust bearing.

SUMMARY

Given this background, one object of the invention was to improve a structure of a floating ring seal.

The ring according to the invention is intended for a floating ring seal and/or is designed as part of a floating ring seal. The ring has an active face, wherein the active face comprises, as a first zone, an inner zone with an inner surface and, as a second zone, an outer zone with an outer surface. The outer zone surrounds the inner zone coaxially here, and each of the two surfaces has a structure produced with a laser and/or structurized. With the laser or by laser processing, a first structure is introduced into the surface of the inner zone and a second structure is introduced into the surface of the outer zone, the structures of the two zones being distinguished from one another in their configuration.

During the operation of the ring, a first direction of rotation and a second direction of rotation are provided, which are opposite to each other. If the ring is rotated in the first direction of rotation, a liquid is delivered radially from the inside to the outside. The active face is also configured and/or designated as a frictional surface, while a particular surface and/or zone is likewise configured and/or designated as a frictional surface.

The inner zone is designed in this case as the first zone of the active face or frictional surface of the ring in order to create a pumping effect for the liquid in the first direction of rotation. In this case, a liquid film is formed on the active face of the ring, which is also designed and/or designated as the running surface, whereupon a friction and as well as wear on the active face are minimized.

The outer zone as the second zone of the active face of the ring, on the other hand, is designed to create a barrier effect for the liquid in the first direction of rotation, with the result that no liquid emerges.

If the ring is rotated in the second direction of rotation, the liquid is delivered radially from the outside to the inside. The outer zone as the second zone of the active face of the ring is designed for the purpose of creating a pumping effect for the liquid in the second direction of rotation, whereas the inner zone as the first zone of the active face of the ring is designed to create a barrier effect for the liquid. Due to the pumping effect, a delivery dependent on the direction of rotation and thus a transport of the liquid through a respective zone is intensified or favored, which, for example, increases the throughput and/or flow of the liquid. By contrast, a delivery of liquid dependent on the direction of rotation is reduced and/or prevented based on the barrier effect, wherein the throughput and/or the flow of the liquid is reduced and/or is stopped.

The ring is intended for a floating ring seal that is designed as part of a drive unit such as an electric machine, for a device, such as a vehicle.

The ring, depending on the design of the drive unit, can rotate or is rotatable in the first direction of rotation when the device is moving forwards, and furthermore, it can rotate or is rotatable in the second direction of rotation when the device is moving backwards. As a rule, a device designed as a vehicle is usually moving forwards. However, depending on the design of the drive unit, it is also possible for the ring to be rotatable in the first direction of rotation when the device is moving backwards, and for the ring to be rotatable in the second direction of rotation when the device is moving forwards.

Furthermore, by definition, it is provided that a first maximum rotational speed in the first direction of rotation is greater than a second maximum rotational speed in the second direction of rotation. In one configuration, the first maximum rotational speed is attained when the device is moving forwards. On the other hand, in the case that the device is moving backwards, the second maximum rotational speed is attained. The directions of rotation of the ring are correlated with the directions of movement of the device. In this case, the device generally moves more often and more intensively forwards than backwards. The structures produced with the laser are adapted to directions of movement of the device.

The ring is designed either as a floating ring or a sealing ring of the floating ring seal and is composed of graphite, for example.

The floating ring seal according to the invention comprises at least one embodiment of the ring according to the invention.

As a rule, the floating ring seal comprises two rings, at least one of the two rings being designed as an embodiment of the ring according to the invention.

It is possible for both rings, one designed as a floating ring and the other designed as a mating ring, to have a respective active face, being turned toward each other, and interacting during an operation of the floating ring seal. As a rule, the active face of one of the two rings is structurized with the laser, so that the inner zone and outer zone of the active face of only one ring are structurized with the laser. It is also possible for the inner zone and outer zone of the active faces of both rings to be structurized with the laser. It is possible for a liquid film to be formed between the active faces of the two rings when the pumping effect is created, thus minimizing the friction and the wear between the rings. If the barrier effect is created, a leakage of liquid is prevented.

In the floating ring seal, at least one of the two rings is arrangeable and/or can be arranged on a shaft, the floating ring seal being designed to seal off the shaft. It is furthermore conceivable to mount a shaft in bearings with one embodiment of the floating ring seal.

The proposed ring or the at least one ring of the proposed floating ring seal has a base body, which in one configuration has the form of a hollow cylinder with two ring-shaped and axially oriented outer walls, one of these two ring-shaped outer walls comprising the active face of the ring. The accordingly ring-shaped active face is furthermore likewise divided into a ring-shaped inner zone and a ring-shaped outer zone. The outer wall and thus the active face has an inner radius and an outer radius, which bounds the active face. The inner zone and the outer zone are separated from each other by a circle and/or abut one another directly along this middle circle. The middle circle has a middle radius which is larger than the inner radius and smaller than the outer radius. Accordingly, the circular inner zone of the active face is bounded by the inner radius and the middle radius, whereas the circular outer zone of the active face is bounded by the middle radius and the outer radius. In possible configuration, the middle radius corresponds at least to a mean value of the inner and outer radius, so that it is possible for the middle radius to correspond to, or is greater than, the mean value.

During an operation of the floating ring seal, the ring is either rotated in the first or in the second direction of rotation, whereupon one of the two directions of rotation is oriented, e.g., clockwise and the other is oriented counterclockwise. In one configuration, the floating ring seal designed as part of a drive unit of a device is designed to seal off a rotatable shaft of the drive unit for the liquid, the liquid being, for example, a coolant and/or lubricant for the drive unit and/or the shaft.

Furthermore, during the operation of the floating ring seal it is provided that the liquid is delivered or transported in one of the two directions of rotation from the inside to the outside and in the other of the two directions of rotation from the outside to the inside. Depending on the direction of rotation, the liquid is at first delivered in the radial direction to one of the two zones, i.e., the inner zone or the outer zone. It is provided in both directions of rotation that one of the two zones, i.e., the inner zone or the outer zone, to which the liquid is delivered first creates the pumping effect for the liquid, whereas the other of the two zones, i.e., the outer zone or the inner zone of the active face, creates the barrier effect for the liquid. Accordingly, regardless of the direction of rotation, at first the pumping effect is created for the liquid by one of the two zones and the barrier effect by the other of the two zones.

It is provided for the ring that the surfaces of both zones of the active face, i.e., the surface of the inner zone and the surface of the outer zone, is structurized with the laser and/or by a laser processing. Thus, it is possible to provide more delicate structures on the surfaces, which minimizes friction, usually friction between two rings of the floating ring seal that interact with each other during the operation thereof, without the liquid in the form of coolant or cooling liquid being able to leak from the floating ring seal.

The structures provided here by the laser for both zones, i.e., the inner zone and the outer zone, are distributed such that they are present and thus active in both directions of rotation. By definition, the liquid in the form of coolant is pumped in the first direction of rotation from the inner radius of the inner zone to the middle radius of the active face of the ring, thereby preventing a drying out of the active face. From the middle radius to the outer radius, which delimit the outer zone, the active face acts as a barrier to leakage of the liquid. On the other hand, it is provided in the second direction of rotation that the surface of the inner zone of the active face works as a barrier to the liquid and thus prevents a leakage.

In one configuration, it is provided that a first maximum rotational speed is attained in the first direction of rotation, which is greater than a second maximum rotational speed that is attained in the second direction of rotation. Furthermore, it is possible that the ring rotates more often and for longer periods of time in the first direction of rotation and more seldom and for shorter periods of time in the second direction of rotation. Accordingly, the device is moved more often forwards than backwards.

With the drive unit having at least one embodiment of the proposed floating ring seal, the device, such as a vehicle, can move in two directions, i.e., either forwards or backwards. Usually the first and greater maximum rotational speed is attained for the drive unit during the movement of the device in the forward direction, whereas the second and lesser maximum rotational speed is attained with the drive unit during the movement of the device in the backward direction. If the device is designed as a vehicle, it will travel forwards if the ring is configured to rotate in the first direction of rotation, and backwards if the ring is configured to rotate in the second direction of rotation. It is provided that the device, which is designed, for example, as a vehicle, travels forwards more often and longer than it travels backwards. Moreover, a higher speed is attained in forward travel than in backward travel. Furthermore, forward travel lasts longer than backward travel. During backward travel, the surface of the inner zone which is structurized with the laser serves by definition as a barrier to the liquid in the second direction of rotation and prevents a leakage. Furthermore, a drying out of the ring during backward travel of the device is not to be expected, since the device moves backwards more seldom, for a shorter time, and with slower speed than forwards.

Thanks to the structurizing of the surface of the inner zone and the surface of the outer zone of the active face of the ring, a structurizing that is created by the laser and/or by laser processing, this active face is optimally apportioned between leakage and lubrication in both directions of rotation. Thus, no failure of the floating ring seal due to drying out or failure of the drive unit due to leakage of the liquid designed as a coolant is to be expected.

Thanks to the special structurizing of the active face provided by the laser, which is now divided into the inner zone and the outer zone, the floating ring seal is optimally adjusted in terms of leakage and avoidance of drying out.

Of course, the above-mentioned features as well as those to be explained below may be used not only in the particular indicated combination but also in other combinations or standing alone, without leaving the scope of the present invention.

BRIEF DESCRIPTION OF THE FIGURES

The invention is represented schematically with the aid of an embodiment in the drawings and shall be described schematically and thoroughly with reference to the drawings.

The figures shall be described coherently and comprehensively, the components in the drawing being associated with the same reference numbers.

DETAILED DESCRIPTION

Figure 1:
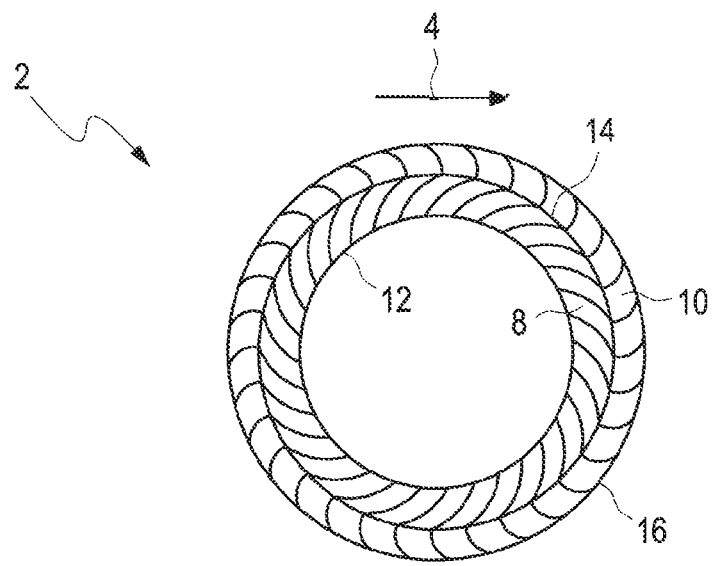
FIG. 1a shows in schematic representation a detail of one embodiment of the ring according to the invention in different operating situations.
FIG. 1b shows in schematic representation another detail of one embodiment of the ring according to the invention in different operating situations.
Figure 1:
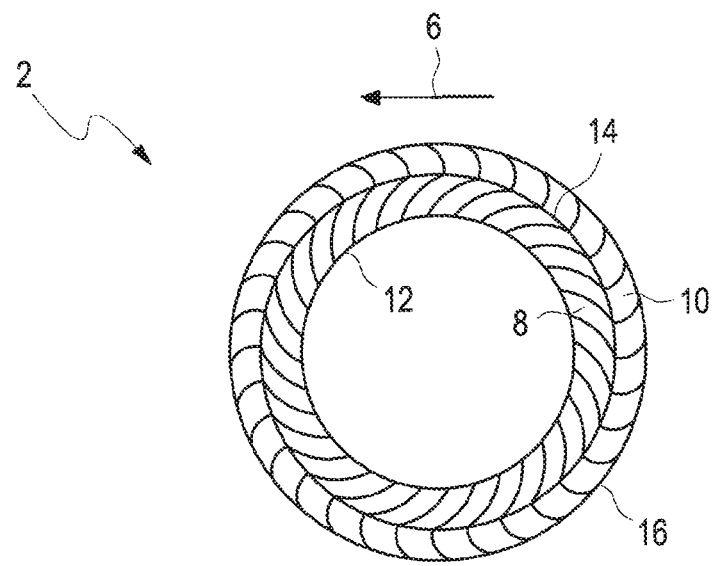

FIG. 1a shows in schematic representation an active face 2 of a ring of a floating ring seal in a first operating situation, in which the ring is rotated in a first direction of rotation, here, clockwise, as indicated by an arrow 4. On the contrary, FIG. 1b shows the active face 2 of the ring in a second direction of rotation, here, counterclockwise, indicated in FIG. 1b by an arrow 6.

The active face 2 of the ring, being circular shaped here, is thereby divided into two coaxially situated circular ring-shaped zones, namely, an inner zone 8 and an outer zone 10. Each zone, i.e., the inner zone 8 and the outer zone 10, has a surface with a structure which is respectively provided by a laser and/or by laser processing and thus structurized, the structure provided for the respective zone being introduced by a laser into its surface and provided thereby.

Furthermore, the inner zone 8 here is bounded by an inner circle 12 with an inner radius and a middle circle 14 with a middle radius. The outer zone 10 is likewise bounded by the middle circle 14 with the middle radius and by an outer circle 16 with an outer radius. The inner zone 8 and the outer zone 10 accordingly border on each other at the middle circle 14 and/or are by definition separated from each other by the middle circle 14. In the embodiment of the ring presented here, it is provided that the middle radius of the middle circle 14 is greater than a mean value of the inner radius of the inner circle 12 and the outer radius of the outer circle 16.

The ring, whose active face 2 is shown in FIGS. 1a and 1b, is designed as part of a floating ring seal, there being situated in the axial direction to the ring a second component of the floating ring seal, likewise fashioned as a ring in the configuration. The active face 2 of the ring shown here is turned toward an active face of the other component, while during an operation of the floating ring seal a spacing between the active faces 2 of the ring and of the other component is varied, making it possible for the active face 2 of the ring shown here to also touch an active face of the other component. The floating ring seal and thus the ring are furthermore designed as components of a drive unit, such as an electrical machine, for the driving of a device, such as a vehicle.

It is provided here that in the event of the floating ring rotating in the first direction of rotation (FIG. 1a), the device designed as a vehicle is moved forwards and thus travels forwards. In this case, the liquid is transported radially from the inside to the outside relative to the active face 2 of the ring, while a pumping effect is generated by the structure of the surface of the inner zone 8 of the active face 2, which is provided by the laser. Furthermore, a barrier effect for the liquid is created by the structure of the surface of the outer zone 10 of the active face 2, as provided by the laser.

On the other hand, if the ring is rotating in the second direction of rotation (FIG. 1b), the vehicle is moved backwards. In this case, the liquid is delivered from the outside to the inside in the radial direction relative to the active face 2 of the ring. A pumping effect for the liquid is created by the structure of the surface of the outer zone 10 of the active face 2, as provided by the laser. Furthermore, a barrier effect is created by the laser-provided structure of the surface of the inner zone 8 of the active face 2 of the ring.

In the embodiment presented here, structures of the surface of the inner zone 8 and the outer zone 10 each time have a spiral pattern. Individual spirals or furrows or grooves of the structure of the surface of the inner zone 8 are structurized or formed by the laser in the clockwise direction from inside to outside, whereas individual spirals or furrows or grooves of the structure of the surface of the outer zone 10 are structurized or formed by the laser in the counterclockwise direction from inside to outside.

The invention claimed is:

1. A ring for a floating ring seal, comprising:
an active face, wherein the active face has an inner zone with a surface and an outer zone with a surface, wherein the outer zone surrounds the inner zone coaxially, wherein each of the two surfaces has a structure;
wherein the inner zone is bounded by an inner circle having an inner radius and a middle circle having a middle radius;
wherein the outer zone is bounded by the middle circle and an outer circle having an outer radius; and
wherein the middle radius is greater than a mean value of the inner radius and the outer radius,
wherein a first direction of rotation and a second direction of rotation of the ring are provided, which are opposite to each other,
wherein in the case when the ring is rotated in the first direction of rotation, a liquid is delivered radially from the inner radius of the inner zone towards the middle radius of the active face such that the inner zone of the active face of the ring creates a pumping effect for the liquid and the outer zone of the active face of the ring creates a barrier effect for the liquid,
wherein in the case when the ring is rotated in the second direction of rotation, the liquid is delivered radially from the outer radius of the outer zone towards the middle radius of the active face such that the outer zone of the active face of the ring creates a pumping effect for the liquid, and the inner zone of the active face of the ring creates a barrier effect for the liquid,
wherein the structure of the surface of the inner zone has a spiral pattern only in a clockwise direction from inside to outside; and
the structure of the surface of the outer zone has a spiral pattern only in a counterclockwise direction from inside to outside,
wherein the ring is provided as a floating ring seal of a drive unit of a device such that when the device is moving forward, the ring rotates in the first direction of rotation, and when the device is moving backward, the ring rotates in the second direction of rotation.

2. The ring according to claim 1, wherein a first maximum rotational speed in the first direction of rotation is greater than a second maximum rotational speed in the second direction of rotation.

3. The ring according to claim 1, wherein the ring is designed as a floating ring or as a sealing ring of the floating ring seal.

4. The ring according to claim 1, wherein the ring is a floating ring seal.

5. The ring according to claim 4, wherein the floating ring seal has two rings.

6. The ring according to claim 5, wherein both rings of the floating ring seal have a respective active face, being turned toward each other, and interacting during an operation of the floating ring seal.

7. The ring according to claim 5, wherein at least one of the two rings of the floating ring seal can be arranged on a shaft of the drive unit, wherein the floating ring seal is designed to seal off the shaft.

8. The ring according to claim 1, wherein the structure of each of the two surfaces is produced with a laser.

9. A method for sealing a shaft of a drive device, comprising:
- provision of a floating ring seal comprising at least one ring, wherein each ring has an active face, the active face comprising an outer zone which coaxially surrounds an inner zone,
- rotation of the at least one ring in a first direction of rotation such that a liquid is delivered radially from an inner radius of the inner zone towards a middle radius between the inner and outer zones, the inner zone creating a pumping effect while the outer zone creates a barrier effect which prevents leakages, and
- rotation of the at least one ring in a second direction of rotation, which is opposite to the first direction of rotation, such that the liquid is delivered radially from an outer radius of the outer zone towards the middle radius between the inner and outer zones, the outer zone creating the pumping effect while the inner zone creates the barrier effect which prevents leakages,
- wherein a surface of the outer zone of each ring is structured with a spiral pattern only in a counterclockwise direction from inside to outside, and a surface of the inner zone of each ring is structured with a spiral pattern only in a clockwise direction from inside to outside,
- wherein forward motion of the drive device causes the at least one ring to rotate in the first direction of rotation and rearward motion of the drive device causes the at least one ring to rotate in the second direction of rotation.

* * * * *